United States Patent
Trainoff

(10) Patent No.: US 11,890,580 B2
(45) Date of Patent: Feb. 6, 2024

(54) FIELD FLOW FRACTIONATOR

(71) Applicant: Wyatt Technology, LLC, Goleta, CA (US)

(72) Inventor: Steven P. Trainoff, Santa Barbara, CA (US)

(73) Assignee: Wyatt Technology, LLC, Goleta, CA (US)

(*) Notice: Subject to any disclaimer, the term of this patent is extended or adjusted under 35 U.S.C. 154(b) by 72 days.

(21) Appl. No.: 17/517,664

(22) Filed: Nov. 2, 2021

(65) Prior Publication Data
US 2022/0134286 A1    May 5, 2022

Related U.S. Application Data

(60) Provisional application No. 63/108,849, filed on Nov. 2, 2020.

(51) Int. Cl.
*B01D 63/08*    (2006.01)

(52) U.S. Cl.
CPC ........ *B01D 63/087* (2013.01); *B01D 2313/04* (2013.01); *B01D 2313/20* (2013.01)

(58) Field of Classification Search
CPC .............. B01D 63/087; B01D 2313/04; B01D 2313/20; B01D 2315/10; B01D 63/08; B01D 63/081; B01D 63/082; B01D 63/084; B01D 63/085; B01D 63/088; G01N 30/0005
See application file for complete search history.

(56) References Cited

U.S. PATENT DOCUMENTS

| | | | | |
|---|---|---|---|---|
| 5,313,061 A * | 5/1994 | Drew | ...................... | H01J 49/26 250/296 |
| 2004/0241785 A1 * | 12/2004 | Schann | .................. | C12M 25/10 435/287.1 |
| 2005/0129580 A1 * | 6/2005 | Swinehart | .......... | B01F 25/4333 422/400 |
| 2008/0003689 A1 * | 1/2008 | Lee | .................... | G01N 30/0005 436/174 |
| 2011/0290724 A1 * | 12/2011 | Wyatt | ............... | G01N 30/0005 210/101 |
| 2014/0134050 A1 * | 5/2014 | Srinivasan | ............. | G01N 30/96 422/70 |
| 2015/0251119 A1 * | 9/2015 | Clavaguera | ........ | B01D 46/0005 29/244 |

* cited by examiner

*Primary Examiner* — Pranav N Patel
(74) *Attorney, Agent, or Firm* — Leonard Guzman

(57) ABSTRACT

The present disclosure describes a field flow fractionator including (1) a top plate assembly including (a) a first non-corrosive material, and (b) at least three fluid fittings machined (simpler) into the material, (2) a spacer, (3) a membrane, (4) a bottom plate assembly including (a) a second non-corrosive material, (b) a cavity machined into the second non-corrosive material, (c) a frit configured to be placed into the cavity, and (d) at least one bottom plate o-ring configured to seal the bottom plate assembly to the spacer, and (5) where the top plate assembly, the spacer, the membrane, and the bottom assembly define a separation channel. In an embodiment, the at least three fluid fittings including a fitting for an in-flow, a fitting for an out-flow, and a fitting for a cross-flow.

8 Claims, 6 Drawing Sheets

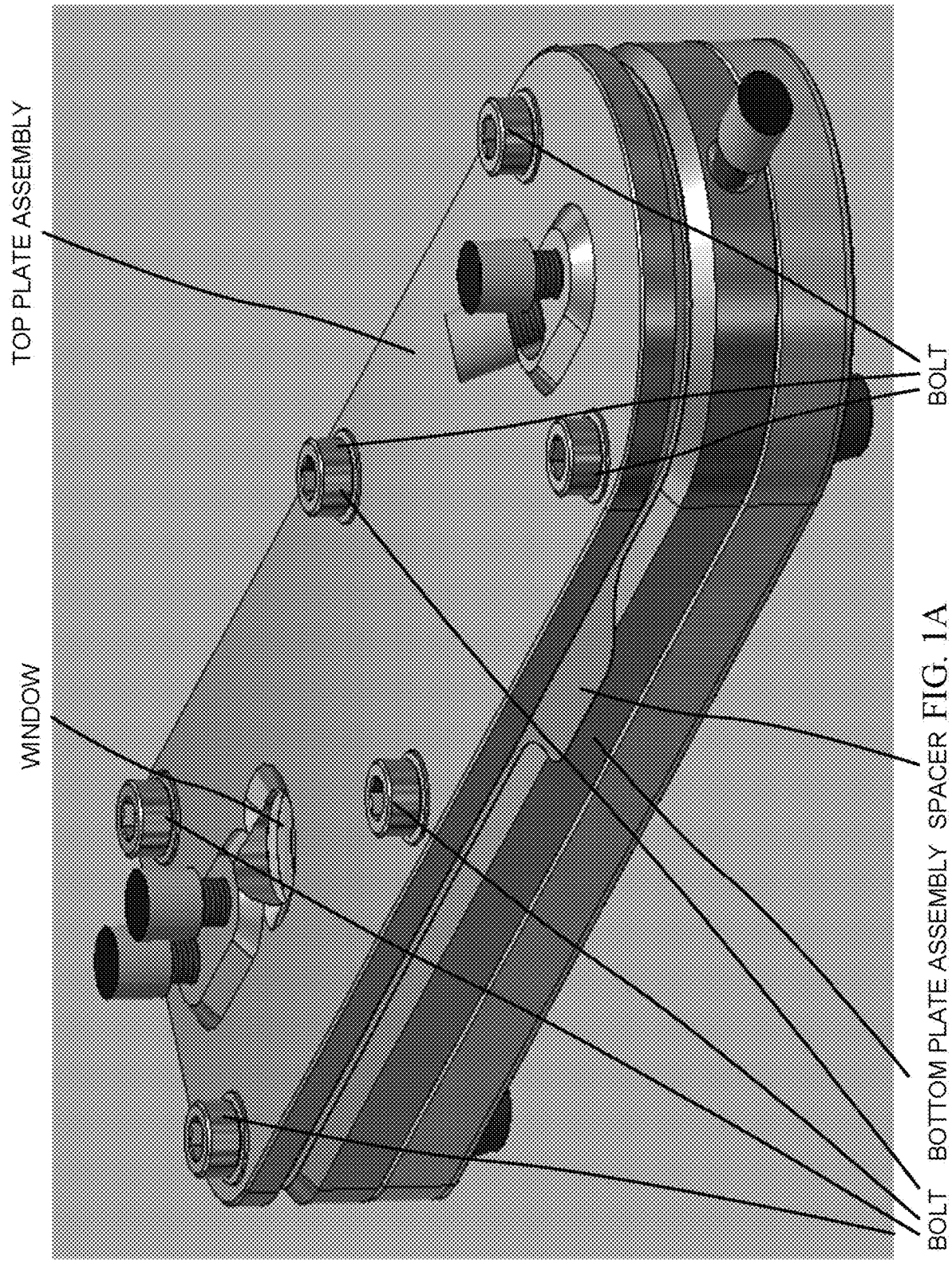

FIELD FLOW FRACTIONATOR

PRIORITY

This application claims priority to U.S. Provisional Patent Application No. 63/108,849, filed Nov. 2, 2020.

BACKGROUND

The present disclosure relates to field flow fractionators, and more specifically, to a field flow fractionator.

SUMMARY

The present disclosure describes a field flow fractionator including (1) a top plate assembly including (a) a first non-corrosive material, and (b) at least three fluid fittings machined (simpler) into the material, (2) a spacer, (3) a membrane, (4) a bottom plate assembly including (a) a second non-corrosive material, (b) a cavity machined into the second non-corrosive material, (c) a frit configured to be placed into the cavity, and (d) at least one bottom plate o-ring configured to seal the bottom plate assembly to the spacer, and (5) where the top plate assembly, the spacer, the membrane, and the bottom assembly define a separation channel. In an embodiment, the at least three fluid fittings including a fitting for an in-flow, a fitting for an out-flow, and a fitting for a cross-flow.

BRIEF DESCRIPTION OF THE DRAWINGS

FIG. 1A depicts a field flow fractionator in accordance with an exemplary embodiment.

DETAILED DESCRIPTION

Figure 1B:
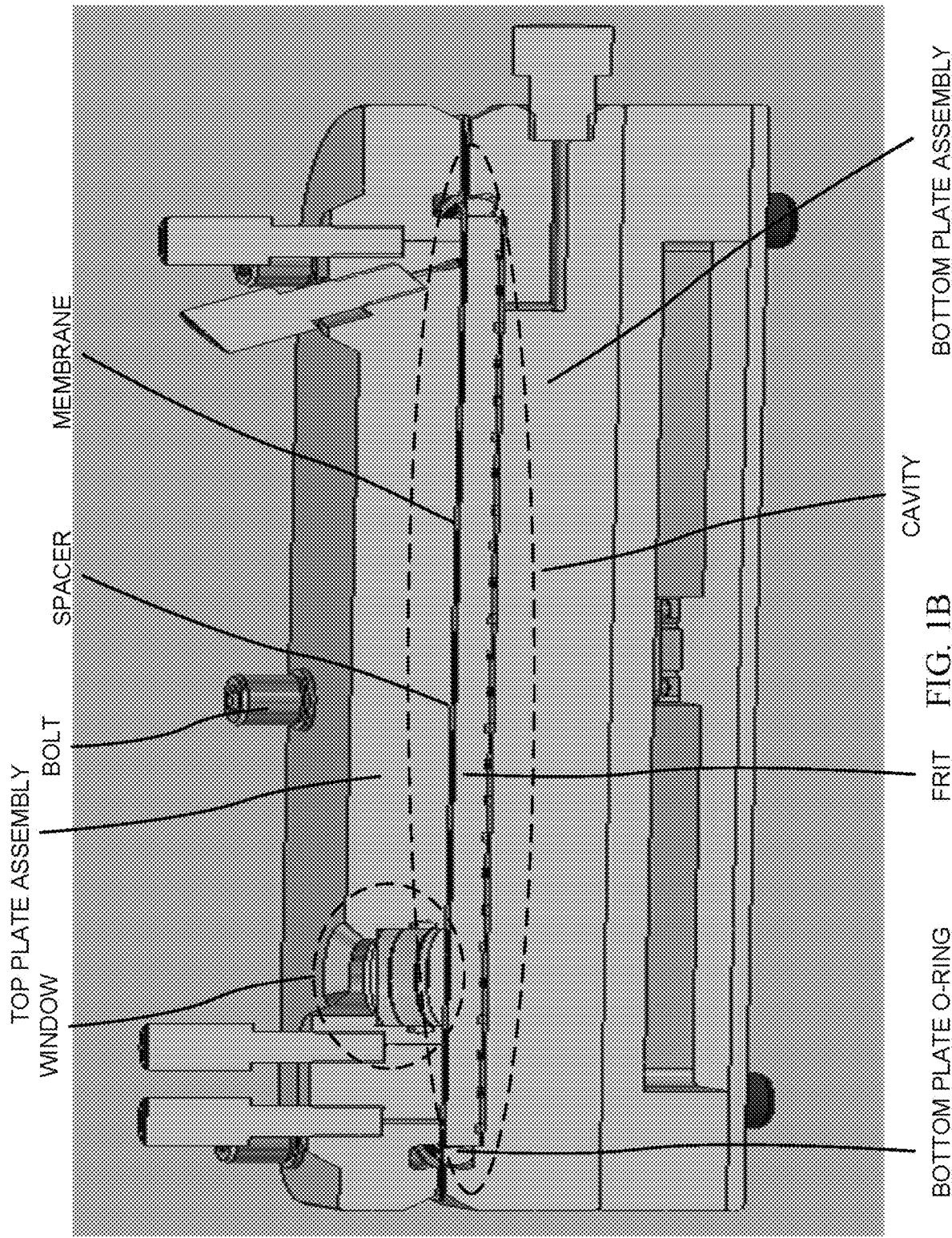
FIG. 1B depicts a field flow fractionator in accordance with an exemplary embodiment.
Figure 1C:
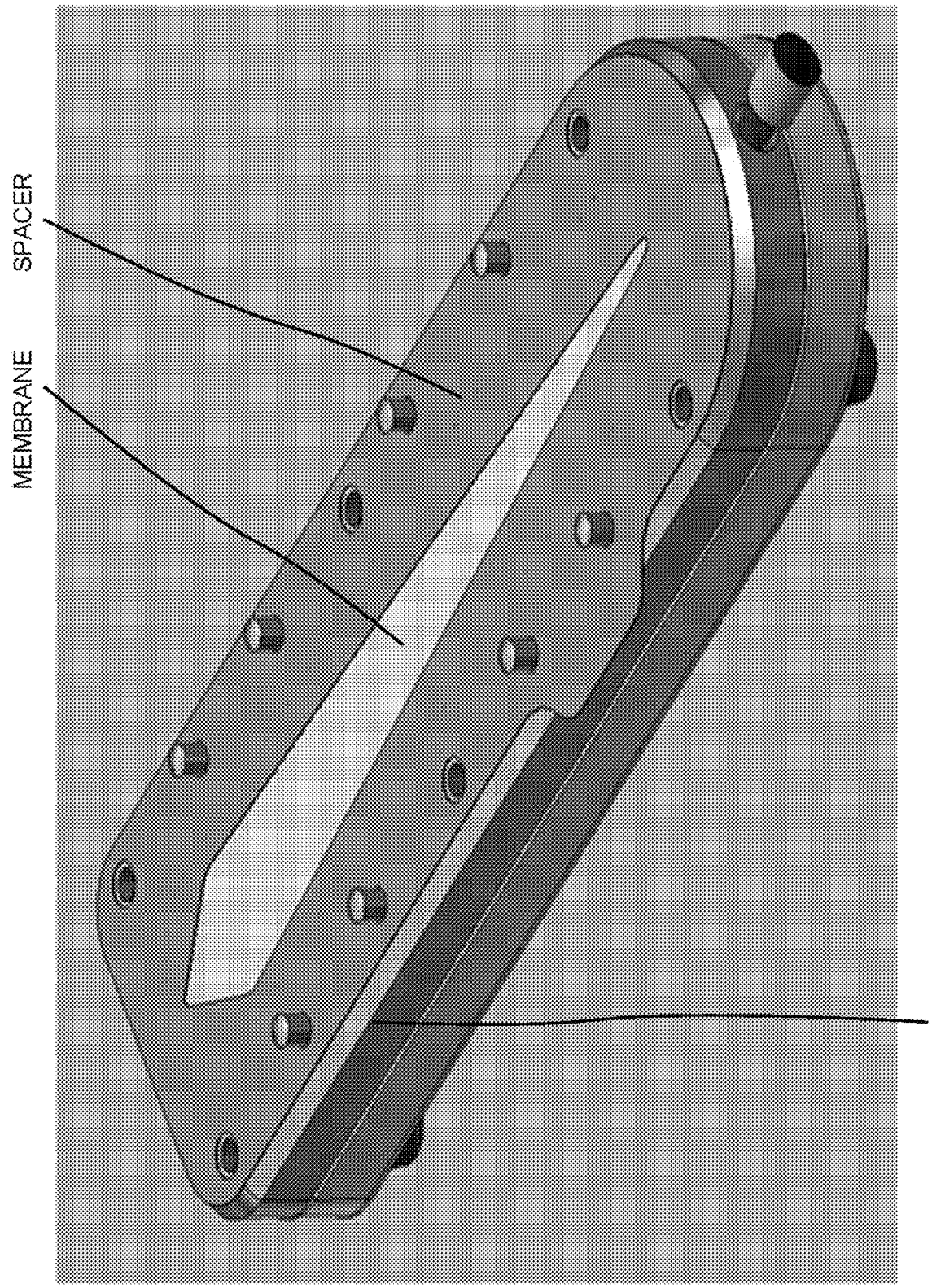
FIG. 1C depicts a field flow fractionator in accordance with an exemplary embodiment.

The present disclosure describes a field flow fractionator including (1) a top plate assembly including (a) a first non-corrosive material, and (b) at least three fluid fittings machined (simpler) into the material, (2) a spacer, (3) a membrane, (4) a bottom plate assembly including (a) a second non-corrosive material, (b) a cavity machined into the second non-corrosive material, (c) a frit configured to be placed into the cavity, and (d) at least one bottom plate o-ring configured to seal the bottom plate assembly to the spacer, and (5) where the top plate assembly, the spacer, the membrane, and the bottom assembly define a separation channel. In an embodiment, the at least three fluid fittings including a fitting for an in-flow, a fitting for an out-flow, and a fitting for a cross-flow.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Field Flow Fractionation

The separation of particles in a solution by means of field flow fractionation, FFF, was studied and developed extensively by J. C. Giddings beginning in the early 1960s. The basis of these techniques lies in the interaction of a channel-constrained sample and an impressed field applied perpendicular to the direction of flow. Among those techniques of current interest is cross flow FFF, often called symmetric flow (SF1FFF), where an impressed field is achieved by introducing a secondary flow perpendicular to the sample borne fluid within the channel. There are several variations of this technique including asymmetric flow FFF (i.e., A4F), and hollow fiber (H4F) flow separation.

Other FFF techniques include (i) sedimentation FFF (SdFFF), where a gravitational/centrifugal cross force is applied perpendicular to the direction of the channel flow, (ii) electrical FFF (EFFF), where an electric field is applied perpendicular to the channel flow, and (ii) thermal FFF (ThFFF), where a temperature gradient is transversely applied.

Common to all these methods of field flow fractionation is a fluid, or mobile phase, into which is injected an aliquot of a sample whose separation into its constituent fractions is achieved by the application of a cross field. Many of the field flow fractionators allow for the control and variation of the strength of the cross field during the time the sample aliquot flows down the channel, be it electrical field, cross flow, thermal gradient, or other variable field.

Symmetric Flow Cross Flow Fractionator (SF1FFF)

As an illustration of the separation of particles by field flow fractionation, a simplification of perhaps the most straightforward system, a SF1FFF, is described. A sample is injected into an inlet port along with the spending mobile phase. The sample is allowed to undergo a so-called "relaxation phase," where there is no applied channel flow, but larger particles are forced further down the height of the channel than smaller particles by the constantly applied cross flow. Once the channel flow is resumed, the sample aliquot begins to undergo non-steric separation while it moves down the length channel with the smaller particles leading the larger ones, as they inhabit a region of the cross section of the channel flow nearer the center of the height of the channel where the channel flow is most swift. By increasing the cross flow rate, the separation of all species continues while the larger fractions begin to trail further behind their smaller sized companions. After exiting the channel through the outlet port the fractionated sample may be analyzed using various detectors.

Asymmetric Flow FFF (A4F)

An asymmetric flow FFF (A4F) is generally considered a variation of the earlier developed SF1FFF. An A4F channel assembly may include (1) a bottom assembly structure 150 holding a liquid-permeable frit surrounded by a sealing O-ring, (2) a permeable membrane that lies on frit, (3) a spacer of thickness from about 75 μm to 800 μm into which has been cut a cavity, and (4) a top assembly structure generally holding a transparent plate of polycarbonate material or glass.

The resulting sandwich is held together with bolts or other means, such as applied pressure adequate to keep the channel sealed against leaks, where such pressure may be applied by vise or clamping mechanism so long as it is able to provide relatively even pressure across the channel assembly such that no leaks occur. The generally coffin-shaped or tapered cavity in spacer serves as the channel in which separation will occur. The top assembly structure usually contains three holes, called ports, that pass through the top plate and are centered above the channel permitting the attachment of fittings thereto. These ports are (a) a mobile phase inlet port located near the beginning of the channel and through which is pumped the carrier liquid, the so-called mobile phase, (b) a sample port, downstream of the inlet port, into which an aliquot of the sample to be separated is introduced to the channel and focused thereunder, and (c) an exit port through which the fractionated aliquot leaves the channel near the end of the cavity.

Field flow fractionation (FFF) systems are commonly used to fractionate particles and molecules by applying a field to a fluid sample so that the particles accumulate against an accumulation wall. For Asymmetric Flow FFF (A4F), sample bearing fluid is passed through a semipermeable membrane which allows the solvent to pass, but retains the sample. The membrane surface forms the accumulation wall and the flow through the membrane is called the cross flow. The Stokes force on the particles causes a flux that pushes the sample towards the membrane. Diffusion of the high concentration near the membrane creates a flux upwards that counteracts the Stokes force. The equilibrium of these fluxes gives rise to an exponential concentration profile, which is maximal on the membrane surface and decays into the bulk. Different size particles will have a different balance between these two fluxes. Large particles will have a large Stokes flux and a small diffusion flux compared to smaller particles, giving rise to a smaller exponential decay length. Both large and small particles have a maximal concentration on the wall, but the smaller ones protrude further into the bulk.

During the fractionation process, a channel flow is applied that is parallel to the planes. Pouiselle flow between the parallel plates produces a velocity shear at the boundary. The smaller particles, which protrude further into the bulk, travel downstream more rapidly than large particles and so elute first, followed by increasingly large particles. This is the well-known FFF mechanism.

Current Technology

Field flow fraction systems have seen moderate commercial success in recent years. The most popular variant of FFF is the asymmetric flow field flow fraction (AF4). However the AF4 market is a tiny compared to competitive fractionation techniques such as size exclusion chromatography (SEC). There are many reasons for this disparity. Part of it is that a modern AF4 system is substantially more expensive than a comparable SEC instrument. Another reason is that SEC is a very mature technology and is very easy to operate. In contrast FFF systems are more difficult to operate and require much more user intervention.

For example, in the early days of SEC, users would routinely buy empty columns and pack them manually. As the market matured, prepacked columns became consumables. The user orders a column from a catalog, connects it to their chromatograph, and begins running samples. The convenience and simplicity of prepacked columns has relegated hand-packing to realm of academic research. Moreover, since columns are made in factories dedicated to their construction their quality is much higher than can typically be achieved by manual packing.

In some sense the AF4 market place is still at the comparable stage of development as SEC when handpacked columns were common. In order to use an AF4 channel, the user must disassemble the channel by removing a large number of bolts, clean the interior, install a new membrane, and laboriously reassembly the channel assembly. The assembly procedure includes using a torque wrench to tighten the bolts in a star-pattern to a specified torque. Then the user must flush the bubbles out and check for leaks. Finally the separation membrane often needs to be conditioned by injecting a sample that binds to non-specific binding sites to prevent subsequent samples from sticking to the membrane and having poor mass recovery. It is the purpose of this disclosure to describe how the AF4 channels can be mass-produced in such a way that like catalog SEC columns, they can be considered consumables. Since the channels will be assembled and tested in the factory, the user is freed from labor and time intensive assembly, leak-checking, and membrane conditioning steps. Since the channels will be consumable elements, the design can be simplified considerably by using molded components that are assembled with inseparable techniques such as gluing, overmolding, thermal and ultrasonic welding. This eliminates the need for o-rings, spacers, and fasteners that need to be adjusted to specific torque settings. Thus, there is a need of a field flow fractionator.

Figure 2:
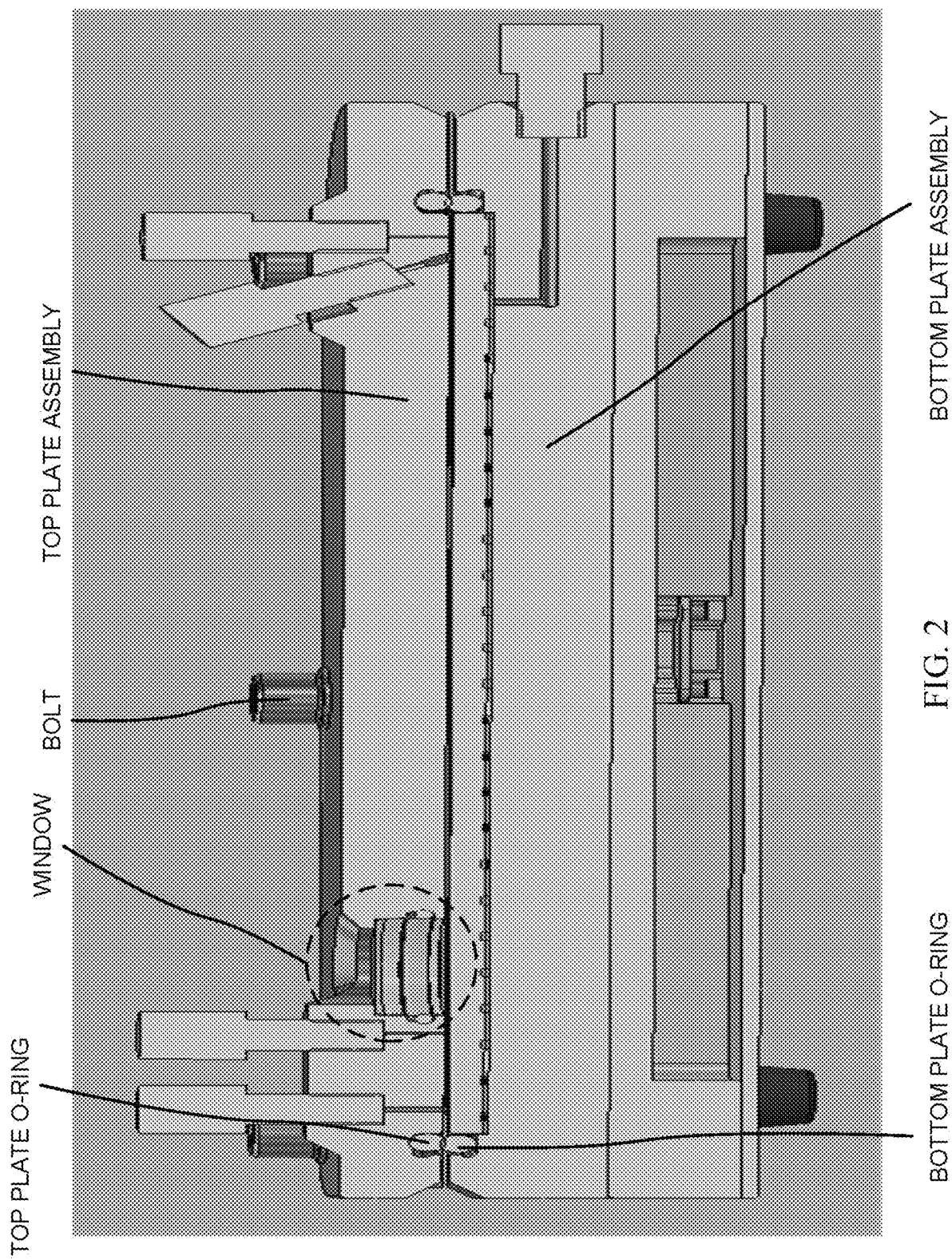
FIG. 2 depicts a field flow fractionator in accordance with an exemplary embodiment.
Figure 3A:
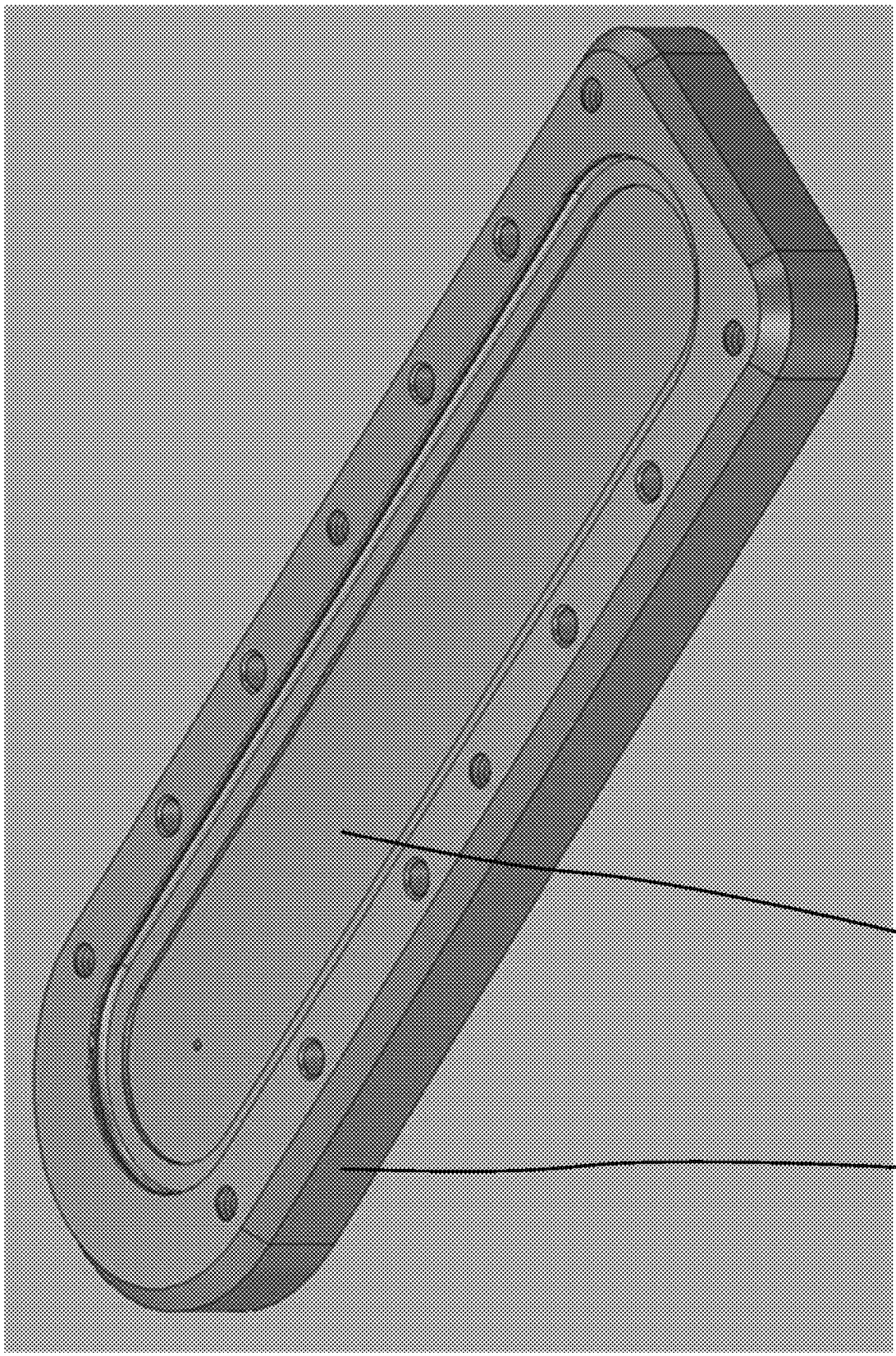
FIG. 3A depicts a field flow fractionator in accordance with an exemplary embodiment.
Figure 3B:
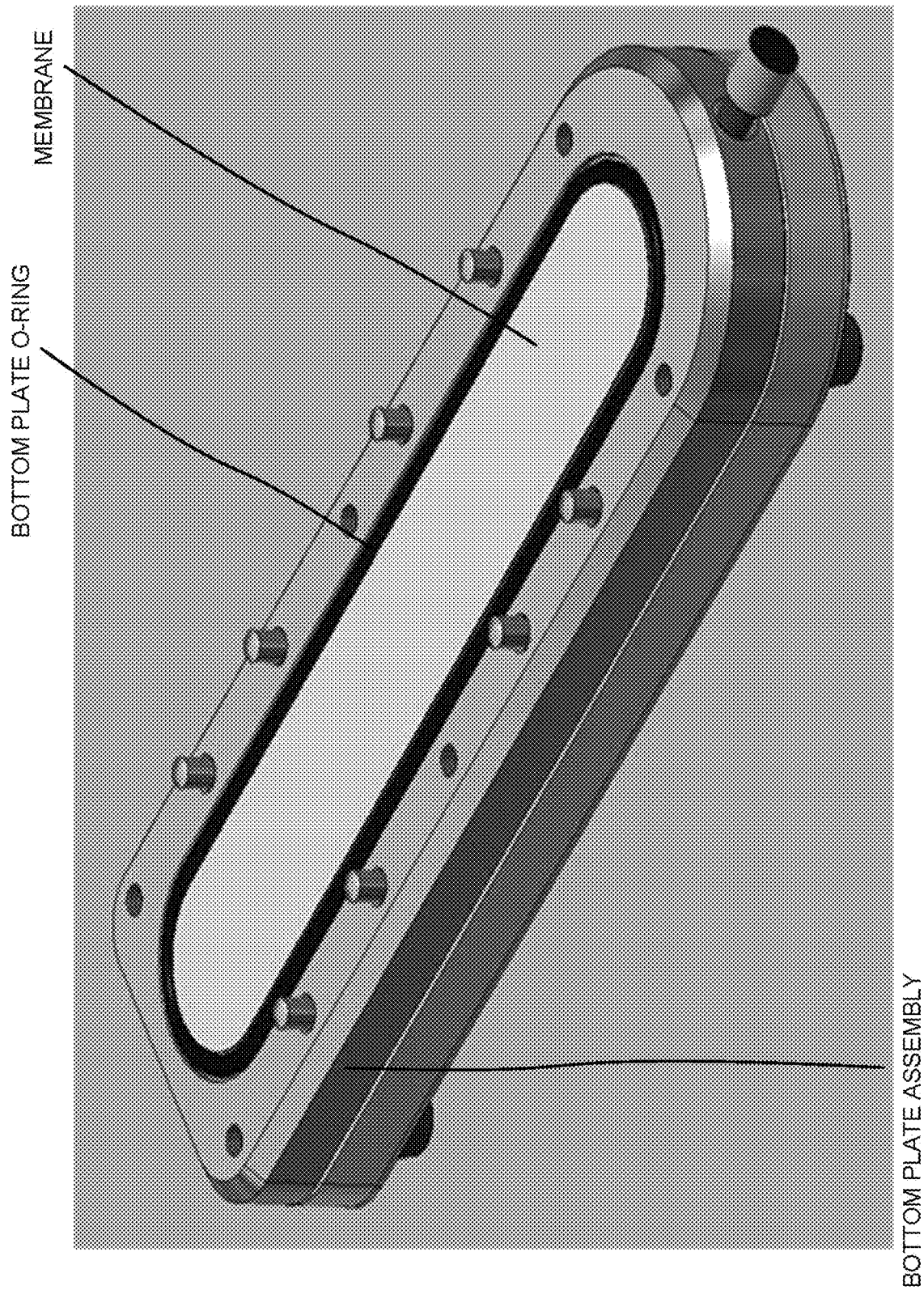
FIG. 3B depicts a field flow fractionator in accordance with an exemplary embodiment.

Referring to FIG. 1A, FIG. 1B, FIG. 1C, FIG. 2, FIG. 3A, and FIG. 3B, in exemplary embodiment, the field flow fractionator including (1) a top plate assembly including (a) a first non-corrosive material, and (b) at least three fluid fittings machined (simpler) into the material, (2) a spacer, (3) a membrane, (4) a bottom plate assembly including (a) a second non-corrosive material, (b) a cavity machined into the second non-corrosive material, (c) a frit configured to be placed into the cavity, and (d) at least one bottom plate o-ring configured to seal the bottom plate assembly to the spacer, and (5) where the top plate assembly, the spacer, the membrane, and the bottom assembly define a separation channel. In an embodiment, the at least three fluid fittings including a fitting for an in-flow, a fitting for an out-flow, and a fitting for a cross-flow Top Plate Assembly In an embodiment, the top plate assembly includes at least one top plate o-ring configured to seal the top plate assembly to the spacer. In an embodiment, FIG. 2 depict the field flow fractionator and the top plate o-ring.

In an embodiment, the top plate assembly includes at least one window. In an embodiment, the at least one window provides and optical channel, allowing for verifying proper operation of the channel. In an embodiment, FIG. 1A, FIG. 1B, and FIG. 2 depict the field flow fractionator and the at least one window.

Bolts and Latches

In a further embodiment, the field flow fractionator further includes bolts to seal the channel and to position a bottom surface of the top plate assembly, the spacer, the membrane, and a top surface the bottom plate assembly to be parallel to each other. In an embodiment, FIG. 1A, FIG. 1B, and FIG. 2 depict the field flow fractionator and the bolts. In a further embodiment, the field flow fractionator further includes washers configured to electrically insulate the bolts from the top plate assembly.

In a further embodiment, the field flow fractionator further includes spring latches to seal the channel and to position a bottom surface of the top plate assembly, the spacer, the membrane, and a top surface the bottom plate assembly to be parallel to each other.

Sensors

In a further embodiment, the field flow fractionator further includes a memory configured to store at least one of a channel geometry, a manufacture date, a membrane chemistry, a construction date, a first wetted date, a number of injections, a number of solvents used, types of solvents used, and a number of samples fractionated. In an embodiment, the memory is a radio frequency identification chip (RFID chip). For example, the channel geometry could describe the length, the width, and/or the thickness of the channel. Also, for example, the manufacture date could describe the date that the field flow fractionator was manufactured. As a further example, the membrane chemistry could describe the type of membrane, the porosity of the membrane, and the molecular weight cutoff of the membrane. For example, the construction could describe the date that the field flow fractionator was constructed. Also, for example, the first wetted date could describe the date that the field flow fractionator was first wetted. As a further example, the number of injections could describe the number of injections that have been introduced to the field flow fractionator. For example, the number of solvents used could describe the number of solvents used in the field flow fractionator. Also, for example, the types of solvents used could describe the types of solvents used in the field flow fractionator. As a further example, the number of samples fractionated could describe the number of samples fractionated by the field flow fractionator.

In a further embodiment, the field flow fractionator further includes at least one environmental sensor configured to measure at least one of a temperature of a solvent flowing through the channel, a pH value of the solvent flowing through the channel, and a conductivity value of the solvent flowing through the channel. In a further embodiment, the field flow fractionator further includes an assembly sensor configured to detect a date on which the field flow fractionator is assembled. For example, the assembly sensor could include a Hall-effect sensor on one side of the assembly sensor and a magnet on another side of the assembly sensor. Also, for example, the assembly sensor could be microswitch/button that could be depressed upon assembly of the field flow fractionator. As another example, the assembly sensor could be an electrical circuit that has an electrical circuit path that is completed upon the assembly of the field flow fractionator. The information from the assembly sensor could be used to limit the number of uses of the field flow fractionator for quality control purposes, due to the aging of the field flow fractionator through use.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A field flow fractionator comprising:
a top plate assembly comprising
a first non-corrosive material,
at least one top plate o-ring, and
at least three fluid fittings machined into the material;
a spacer, wherein the top plate assembly is sealed to the spacer by the at least one top plate o-ring;
a membrane;
a bottom plate assembly comprising
a second non-corrosive material,
a cavity machined into the second non-corrosive material,
a frit configured to be placed into the cavity, and
at least one bottom plate o-ring configured to seal the bottom plate assembly to the spacer, wherein the spacer is one and only one spacer, and wherein the top plate assembly and the bottom plate assembly are sealed to the one and only one spacer; and
wherein the top plate assembly, the spacer, the membrane, and the bottom plate assembly define a separation channel.

2. The field flow fractionator of claim 1 wherein the top plate assembly comprises at least one window.

3. The field flow fractionator of claim 1 further comprising bolts to seal the channel and to position a bottom surface of the top plate assembly, the spacer, the membrane, and a top surface of the bottom plate assembly to be parallel to each other.

4. The field flow fractionator of claim 1 further comprising spring latches to seal the channel and to position a bottom surface of the top plate assembly, the spacer, the membrane, and a top surface of the bottom plate assembly to be parallel to each other.

5. The field flow fractionator of claim 3 further comprising washers configured to electrically insulate the bolts from the top plate assembly.

6. The field flow fractionator of claim 1 further comprising a memory configured to store at least one of a channel geometry, a manufacture date, a membrane chemistry, a construction date, a first wetted date, a number of injections, a number of solvents used, types of solvents used, and a number of samples fractionated.

7. The field flow fractionator of claim 1 further comprising at least one environmental sensor configured to measure at least one of a temperature of a solvent flowing through the channel, a pH value of the solvent flowing through the channel, and a conductivity value of the solvent flowing through the channel.

8. The field flow fractionator of claim 1 further comprising an assembly sensor configured to detect a date on which the field flow fractionator is assembled.

* * * * *